United States Patent [19]

Roach

[11] 3,963,893

[45] June 15, 1976

[54] ADJUSTMENT DEVICE FOR METAL DISINTEGRATORS

[75] Inventor: Jere H. Roach, Rocky River, Ohio

[73] Assignee: Cammann Mfg., Co., Inc., Bay Village, Ohio

[22] Filed: Mar. 17, 1975

[21] Appl. No.: 558,894

Related U.S. Application Data

[63] Continuation-in-part of Ser. No. 541,270, Jan. 15, 1975.

[52] U.S. Cl. ................................ 219/69 R; 90/17; 408/236
[51] Int. Cl.² ..................... B23K 9/16; B23C 1/12
[58] Field of Search ............. 219/69 R, 69 E, 69 V, 219/68; 90/14, 16, 17; 408/234, 236

[56] References Cited

UNITED STATES PATENTS

| 1,394,843 | 10/1921 | Keyes | 90/17 |
| 2,479,412 | 8/1949 | Rutter | 219/69 V |
| 3,417,949 | 12/1968 | Waber | 408/234 X |
| 3,665,148 | 5/1972 | Yasenchak et al. | 219/125 R |
| 3,806,691 | 4/1974 | Roach | 219/69 R X |
| 3,840,718 | 10/1974 | Myers | 219/69 R |

Primary Examiner—Bruce A. Reynolds
Attorney, Agent, or Firm—Woodling, Krost, Granger & Rust

[57] ABSTRACT

An adjustment device for mounting a metal disintegrator head to a support is described comprising a first and a second housing with the first housing being mounted to the support and the second housing being mounted to the disintegrator head. One of the first and second housings has a mounting member and a plate member. Means are provided for relatively journaling the mounting member and the plate member about a first axis. A hinge interconnects the first and second housings enabling movement between the first and second housings about a hinge axis which is substantially perpendicular to the first axis. Locking means is provided for locking the position of the first housing relative to the second housing about the hinge axis. The foregoing abstract is merely a resume of one general application, is not a complete discussion of all principles of operation or applications, and is not to be construed as a limitation on the scope of the claimed subject matter.

14 Claims, 9 Drawing Figures

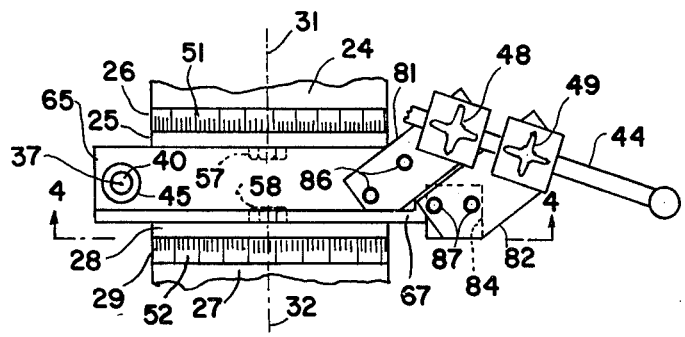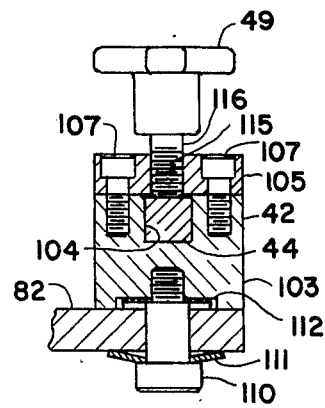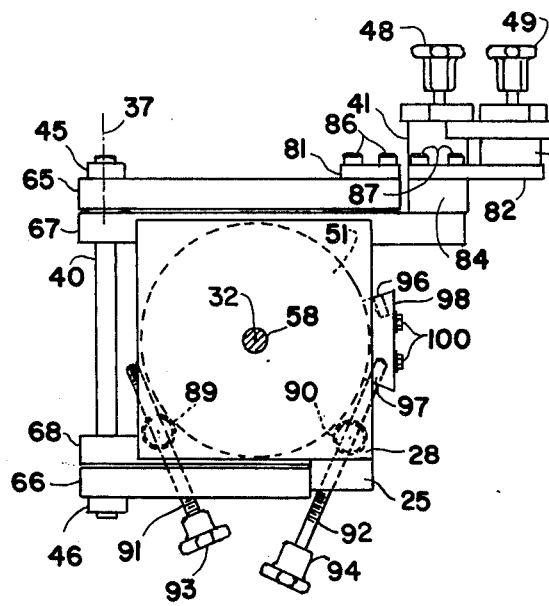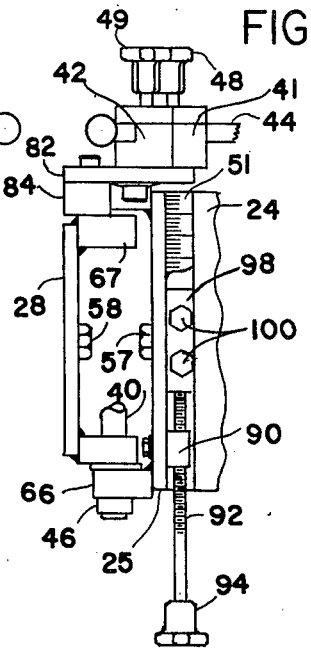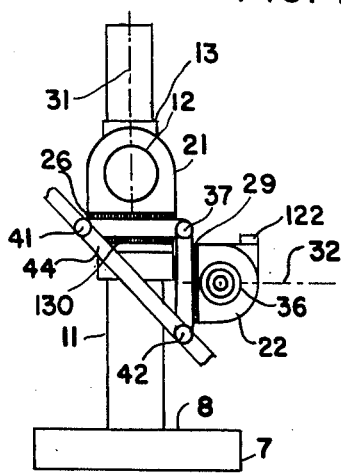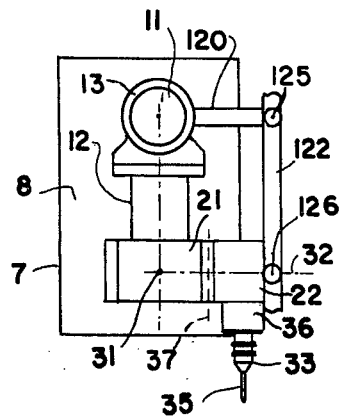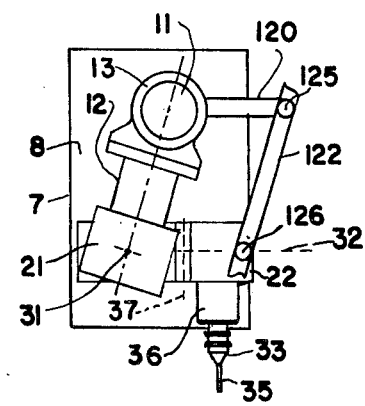

ADJUSTMENT DEVICE FOR METAL DISINTEGRATORS

CROSS-REFERENCE TO RELATED APPLICATION

This is a continuation-in-part of my prior pending application Ser. No. 541,270 filed Jan. 15, 1975.

BACKGROUND OF THE INVENTION

1. Field of the Invention

The invention relates to electric heating, cutting or disintegrating and more particularly to devices for mounting a disintegrator to a support.

2. Background of the Invention

Various types of tool positioners which are adjustable about an axis have been known to the prior art. Such adjustable units have been used to position electrodes in disintegrators to enable welding current to burn away or disintegrate a broken drill or tap in a hole of a workpiece. In many cases a workpiece represents a substantial investment in both material and machining costs. It is therefore desirable to remove the broken drill or tap from such a partially completed workpiece.

In order to operate a disintegrator device it is imperative that the electrode be axially aligned relative to the hole containing the broken drill or tap. An adjustable locking unit between the support and the disintegrator head enables rotation of the disintegrator head to axially align the disintegrator electrode with the hole. There have been such devices in the prior art but none of them have completely satisfied the conditions of the disintegrator art. For example, in many applications the disintegrator head must be rotated about more than a single axis to properly position the disintegrator head relative to the workpiece. Many times it is desirable to have movement about two axes which are offset from one another. In addition, an adjustment mechanism is sometimes required to sustain the weight of the disintegrator head and orient the disintegrator head relative to the workpiece. A further requirement of the disintegrator art is to provide 360° rotation for the disintegrator head. Therefore, an object of this invention is to provide a unit for mounting a disintegrator head to a support wherein the disintegrator head is adjustable about three axes of rotation.

Another object of this invention is to provide a unit for mounting a disintegrator head to a support having three axes of rotation wherein one of the axes is substantially perpendicular to and offset from the remaining axes.

Another object of this invention is to provide a unit for mounting a disintegrator head to a support wherein rotation about one axis is effected by a hinge like structure.

Another object of this invention is to provide a unit for mounting a disintegrator head to a support which is easily adaptable to existing disintegrator housings.

Another object of this invention is to provide a unit for mounting a disintegrator head to a support which is economical and reliable.

SUMMARY OF THE INVENTION

The invention may be incorporated into an adjustment device for mounting a disintegrator head to a support, comprising in combination: a first housing, means for mounting said first housing to the support, a second housing, means for mounting the disintegrator head to said second housing, one of said first and second housings having a mounting member and a plate member, means for relatively journaling said mounting member and said plate member about a first axis, hinge means interconnecting said first and second housings for enabling movement between said first and second housings about a hinge axis substantially perpendicular to said first axis, and locking means for locking the position of said first housing relative to said second housing about said hinge axis.

Other objects and a fuller understanding of the invention may be had by referring to the following description and claims, taken in conjunction with the accompanying drawings.

BRIEF DESCRIPTION OF THE DRAWINGS

FIG. 3 is a side view of the adjustment device shown in FIG. 1;

FIG. 4 is a bottom view of the adjustment device shown in FIG. 1;

FIG. 5 is an end view of the adjustment device shown in FIG. 1;

FIG. 6 is an enlarged view of a portion of the adjustment devices shown in FIGS. 3–5;

FIG. 7 is a simplified front view of the disintegrator machine shown in FIG. 1;

FIG. 8 is a top view of the machine shown in FIG. 7; and

FIG. 8A is a top view of the machine shown in FIG. 7 in an altered position.

DESCRIPTION OF THE PREFERRED EMBODIMENT

Figure 1:
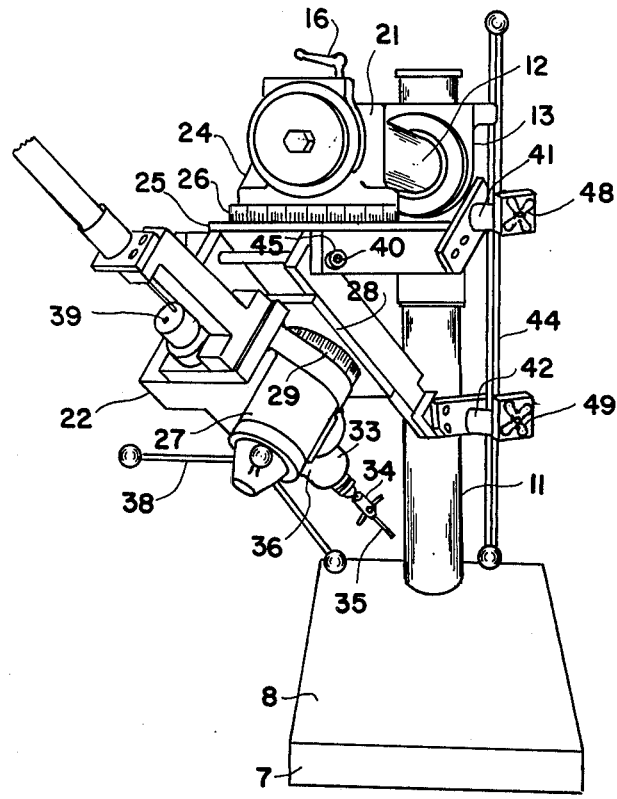
FIG. 1 is a frontal perspective view of a disintegrator machine incorporating the instant invention.

FIG. 1 is a frontal perspective view of a disintegrator machine incorporating the instant invention. The machine comprises a support 7 having a substantially horizontal work surface 8 for receiving a workpiece (not shown) which may have a broken drill or tap jammed in a hole. A first beam 11 extends substantially vertically from the support 7 and perpendicularly suspends a second horizontal beam 12 through a housing 13. The second beam 12 is substantially parallel to the surface 8 of the support 7. The housing 13 enables rotation of the second beam 12 about the first beam 11 in addition to enabling the height of the second beam 12 above the surface 8 to be varied in accordance with the workpiece on the surface 8. A first housing 21 is mounted to the second beam 12 to enable the first housing 21 to be linearly moved along and rotated about an axis through the second beam 12. A locking lever 16 secures the orientation of the first housing 21 relative to the second beam 12. The first housing 21 comprises a first mounting member 24 and a first plate member 25 which is journaled from the first mounting member 24 to provide relative rotation about a first axis 31. A numerical scale 26 mounted to the first mounting member 24 indicates the orientation about the first axis 31 of the first plate member 25 relative to the first mounting member 24. A second housing 22 includes a second mounting member 27 and a second plate member 28 which is journaled from the second mounting member 27 to provide relative rotation about a second axis 32. A numerical scale 29 mounted to the second mounting member 27 indicates the orientation about the second axis 32 of the second mounting member 27 relative to the second plate member 28. The second mounting member 27 is adapted to receive a disintegrator head 33 having a chuck 34 for holding a tool 35 shown as an electrode for disintegrating a broken tap or drill in a workpiece. The disintegrator head 33 is mounted on a slide 36 having a rack 30 shown in FIG. 2 which cooperates with a pinion (not shown) internal the second housing 22 to move the slide 36 upon rotation of a spoked handwheel 38. The disintegrator head 33 is connected to a power supply (not shown) through a connector 39.

The invention includes a hinge extending from a region proximate an edge of each of the first and second housings 21 and 22 for receiving a hinge pin 40 secured by a collar 45 enabling angular movement of the first and second housings 21 and 22 about a hinge axis 37 through the hinge pin 40. The hinge axis 37 is substantially perpendicular to and offset from the first axis of rotation 31 between the first mounting member 24 and the first plate member 25 and is substantially perpendicular to and offset from the second axis of rotation 32 between the second mounting member 27 and the second plate member 28. A first and a second coupling member 41 and 42 are connected to the first and second plate members 25 and 28 respectively on ends opposite to the hinge pin 40. A connection member 44 slidably engages with the first and second coupling members 41 and 42 to form three apices 40, 41, and 42 of a triangle. Plural handwheels 48 and 49 are connected to the first and second coupling members 41 and 42 for securing the connection member 44 relative to the coupling members 41 and 42 to lock the orientation of the first and second housings 21 and 22 about the hinge axis 37.

From the foregoing description of the disintegrator machine shown in FIG. 1 it is apparent that the second beam 12 may be vertically moved and rotated about the first beam 11. The first housing 21 may be linearly moved along and rotated about the axis of the second beam 12. The first plate member 25 may be rotated about the first axis 31 relative to the first mounting member 24, and the second mounting member 27 may be rotated about the second axis 32 relative to the second plate member 28. The first and second housings 21 and 22 can be moved relative to one another about the hinge axis 37 extending through the hinge pin 40 which hinge axis is perpendicular to and offset from the first and second axes. Finally, the disintegrator head 33 can be linearly moved relative to the second mounting member 27 on the slide 36. A more detailed description of the mechanism enabling this unique versatility will be hereinafter described in FIGS. 2–8.

Figure 2:
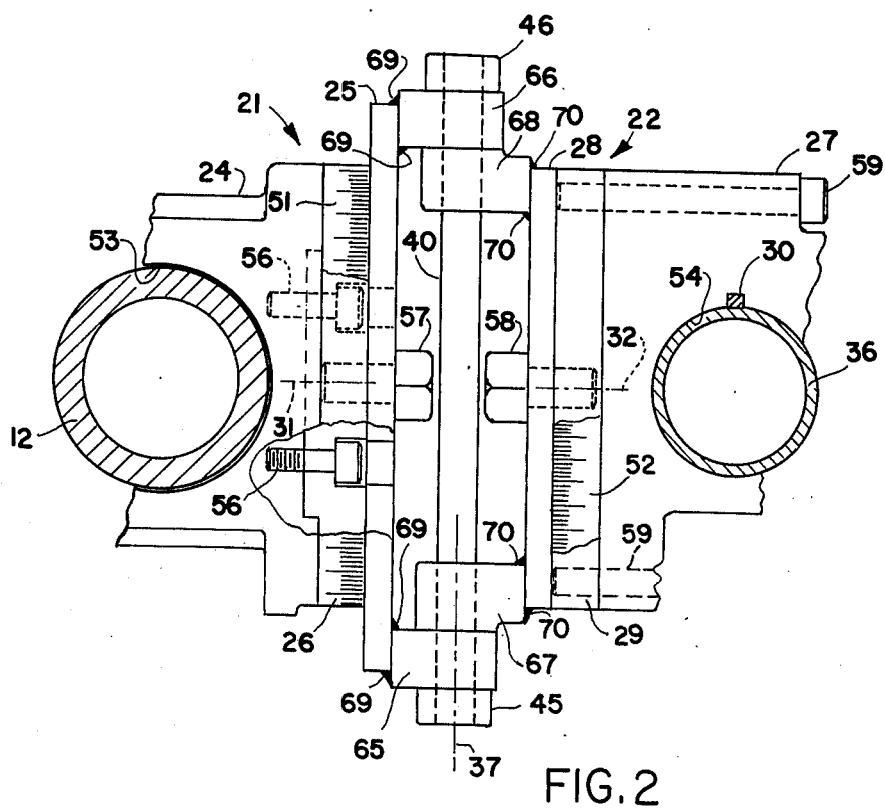
FIG. 2 is an enlarged view partially in section of the adjustment device of the machine shown in FIG. 1, and with the machine in a different adjusted position.

FIG. 2 is a partial view of the invention shown in FIG. 1 illustrating the first housing 21 including the first mounting member 24 having an aperture 53 for engagement with the second beam 12. A first calibration ring 51 is secured to the first mounting member 24 and forms a part thereof by screws 56. The outer perimeter of the calibration ring 51 includes scale 26 shown in FIG. 1. The first plate member 25 is journaled with the first mounting member 24 about the first axis 31 by a bolt 57 which extends through an aperture in the first plate member 25 into the calibration ring 51. When the bolt 57 is loosened, the first plate member 25 can be rotated on the first axis 31 relative to the first mounting member 24. When the bolt 57 is tightened, friction locks the first plate member 25 relative to the first mounting member 24. The first plate member 25 includes brackets 65 and 66 secured to ends of the first plate member 25 by welds 69 with the brackets 65 and 66 having apertures for receiving the hinge pin 40.

The second housing 22 includes the second mounting member 27 having an aperture 54 for receiving the slide 36 of the disintegrator head 33. A second calibration ring 52 is secured to the second mounting member 27 and forms a part thereof by screws 59. The second plate member 28 is journaled with the second mounting member 27 about the second axis 32 by a bolt 58 which extends through an aperture in the second plate member 28 into the second calibration ring 52. When the bolt 58 is loosened, the second mounting member 27 can be rotated on the second axis 32 relative to the second plate member 28. When the bolt 58 is tightened, friction locks the second mounting member 28 relative to the second plate member 27. The outer perimeter of the calibration ring 52 includes the scale 29 shown in FIG. 1. The second plate member 28 includes brackets 67 and 68 secured to ends of the second plate member 28 by welds 70 with the brackets 67 and 68 having apertures for receiving the hinge pin 40. The hinge pin 40 provides movement of the second housing 22 relative to the first housing 21 about the hinge axis 37. The first plate member 25 may be rotated relative to the first mounting member 24 about the first axis 31 whereas the second mounting member 27 may be rotated relative to the second plate member 28 about the second axes 32. The first housing 21 may be rotated relative to the second housing 22 about the hinge axis 37 which is perpendicular to and offset from the first and second axes 31 and 32. The hinge pin 40 is locked into position by collars 45 and 46.

FIGS. 3–5 illustrate various partial views of the invention shown in FIGS. 1 and 2. The first and second mounting members 24 and 27 are shown in FIG. 3 to be adjacent the first and second calibration rings 51 and 52 which are in rotational engagement with the first and second plate members 25 and 28. The brackets 65 and 66 are welded to the first plate member 25 on the side opposite the first mounting member 24. The brackets 67 and 68 are welded to the second plate member 28 on the side opposite to the second mounting member 27. The hinge pin 40 is shown as a pin extending through brackets 65–68 with collars 45 and 46 secured to the ends of the pin. The brackets 65–68 have been shown welded to the plate members 25 and 28 but it is understood that other fastening means may be incorporated in the instant invention. A first coupling arm 81 is mounted to bracket 65 by screws 86 and extends outwardly from bracket 65 for receiving the first coupling member 41. A second coupling arm 82 is mounted to bracket 67 through a block 84 by screws 87 and extends outwardly from bracket 67 receiving the second coupling member 42. The block 84 locates the second coupling arm 82 in the same plane as the first coupling arm 81.

FIGS. 4 and 5 show pivotable nuts 89 and 90 mounted to the first plate member 25 for receiving threaded studs 91 and 92 having handwheels 93 and 94. The ends of the threaded studs 91 and 92 cooperate with aperturess 96 and 97 in a block 98 which is secured to the first calibration ring 51 by screws 100. Accordingly, when bolt 57 is loosened one of the threaded studs 91 and 92 will engage one of the apertures 96 and 97 in the block 98 to prevent the second housing 22 and the plate members 25 and 26 from rapidly rotating if the disintegrator head 33 is in a position which is not counterbalanced. The orientation of the hinge pin axis 37 and the second housing 22 can be adjusted by tightening or loosening the appropriate one of the handwheels 93 and 94. One of the handwheels 93 and 94 adjusts the orientation of the second housing 22 when the second housing 22 is in a first position whereas the other of the handwheels 93 and 94 adjusts the orientation of the first and second plate members 25 and 28 when they are in the order of 180° from the first position. Although a single set of studs 91 and 92 have been shown affixed to the first plate member 25, it is understood that a second set of these components may be incorporated between the second plate member 28 and the second calibration ring 52.

FIG. 6 is an enlarged sectional view of the second coupling member 42 shown in FIGS. 1 and 3–5 which is substantially identical to the first coupling member 41. The coupling member 42 includes a coupling bushing 103 and a coupling plate 105 secured to the coupling bushing 103 by plural screws 107 forming a rectangular aperture 104 to slidably engage the connection member 44. A shoulder bolt 110 extends through the second coupling arm 82 with a first spring washer 111 located between the bolt head and the coupling arm 82 and with a second spring washer 112 located between the bushing 103 and the shoulder of the bolt 110. The washers 111 and 112 are commonly referred to as "Belleville" washers. Bolt 110 is tightened until the second washer 112 is flattened locking the bolt 110 to the bushing 103 but the first washer 111 is only partially flattened due to appropriate depth of recess in bushing 103. The first washer 111 provides a controlled pressure between the second coupling arm 82 and the coupling bushing 103 to allow rotation of the bushing 103 relative to the arm 82 with an appropriate amount of frictional force therebetween. The second washer 112 aids in locking bolt 110 to bushing 103 in addition to distributing the force of the shoulder of bolt 110 against the bushing 103.

The rectangular aperture 104 receives the connection member 44 shown as a rod having a substantially square cross-section. The coupling plate 105 includes a threaded aperture 115 for receiving a threaded stud 116 connected to the handwheel 49 shown in FIGS. 1 and 3–5. The connection member 44 is slidably engaged with the first and second coupling members 41 and 42. Rotation of handwheel 49 results in engagement between the stud 116 and the connection member 44 to secure the connection member 44 relative to the second coupling member 42.

FIG. 7 is a simplified front view of the disintegrator machine shown in FIG. 1. The first beam 11 extends vertically from the surface 8 of the support 7 with the second beam 12 extending horizontally from the first beam 11. The first axis 31 of the first housing 21 is established parallel to the first beam 11. The second axis 32 is shown substantially horizontal with the connection member 44 securing the angular relation between the first and second housings 21 and 22.

FIG. 8 is a top view of the machine shown in FIG. 1. The machine includes a beam arm 120 which is fixed relative to the first beam 11 with a connection bar 122 interconnecting the second housing 22 and the beam arm 120. A scale 130 shows the relative position of beam arm 120 about the first beam 11. The connection points 125 and 126 allow rotation or locking between the connection bar 122 and the beam arm 120 and the second housing 22 respectively. This rotation may be effected by coupling members similar to 41 and 42, not shown. The connection bar 122 is established to be substantially parallel to the second beam 12 forming two sides of a parallelogram whereas the beam arm 120 and the first and second housings 21 and 22 form the remaining two sides of the parallelogram. The parallelogram may be established by adjusting appropriate readings on the scales 26 and 130 to locate the axis 32 parallel to the beam arm 120.

FIG. 8A is a top view of the machine shown in FIGS. 7 and 8 with the second beam 12 being rotated clockwise approximately 30° relative to FIG. 8 about the first beam 11. The rotation of the second beam 12 about the first beam 11 causes a displacement of the disintegrator electrode 35 relative to the support 7. The rotation of the second beam 12 about the first beam 11 also causes rotation of the second housing 22 about the first axis 31 to maintain the orientation of the electrode 35 relative to the support 7. The parallelogram insures that rotation of the second beam 12 about the first beam 11 will cause a simultaneous corresponding rotation of the second housing about the first axis 31 to maintain the angular position of the electrode 35 relative to the support 7.

The orientaton of the beam arm 120 may be adjusted by a lockable device for example the angle adjustment for Metal Disintegrator shown in my prior pending application, Ser. No. 541,270, filed Jan. 15, 1975. The Angle Adjustment may be incorporated at various places within the instant invention including the first and second housings at the first and second axis 31 and 32. Accordingly, I hereby incorporate by reference my prior pending patent application, Ser. No. 541,270, filed Jan. 15, 1975.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. An adjustment device for mounting a disintegrator head to a support, comprising in combination:
   a first housing;
   means for mounting said first housing to the support;
   a second housing;
   means for mounting the disintegrator head to said second housing;
   one of said first and second housings having a mounting member and a plate member;
   means for relatively journaling said mounting member and said plate member about a first axis;
   hinge means interconnecting said first and second housings for enabling movement between said first and second housings about a hinge axis substantially perpendicular to and offset from said first axis;
   and locking means for locking the position on said hinge axis of said first housing relative to said second housing.

2. A device as set forth in claim 1, wherein said means for mounting said first housing to the support includes means enabling relative movement between said first housing and the support.

3. A device as set forth in claim 2, wherein said relative movement between said first housing and the support includes longitudinal and rotational movement relative to the support.

4. A device as set forth in claim 1, wherein said means for mounting the disintegrator head to said second housing includes means enabling relative movement between the disintegrator head and said second housing.

5. A device as set forth in claim 1, including screw adjustment means established between said mounting member and said plate member for adjusting the angular relationship between said mounting member and said plate member.

6. A device as set forth in claim 1, wherein said one of said first and second housings having a mounting member and a plate member includes said first housing having a first mounting member and a first plate member;

said second housing having a second mounting member and a second plate member;

and means for relatively journaling said second mounting member and said second plate member about a second axis.

7. A device as set forth in claim 1, including means for preventing relative rotation between said first and second housings about said first axis.

8. A device as set forth in claim 1, wherein said locking means includes a connection member extending between said first and second housings and spaced from said hinge axis.

9. A device as set forth in claim 1, wherein said locking means includes a first and a second coupling member mounted to said first and second housings, respectively;

a connection member slidably engaging with one of said first and second coupling members forming apices of a triangle at said first and second coupling members and said hinge means;

and fastening means for securing said connection member relative to said one of said first and second coupling members.

10. A device as set forth in claim 1, wherein said hinge means interconnects a region proximate an edge of said first housing with a region proximate an edge of said second housing.

11. A device as set forth in claim 1, wherein said means for mounting said first housing to the support includes a first beam extending from the support;

a second beam rotatably mounted to and extending substantially perpendicular from said first beam;

and said first housing being mounted to said second beam.

12. A device as set forth in claim 11, including a beam arm extending from said first beam;

and means interconnecting said second housing and said beam arm providing a constant angular orientation of said second housing relative to the support when said second beam is rotated about said first beam.

13. An adjustment device for mounting a disintegrator head to a support, comprising in combination:

a first housing;

means for mounting said first housing to the support;

a second housing;

means for mounting the disintegrator head to said second housing;

one of said first and second housings having a mounting member and a plate member;

means for relatively journaling said mounting member and said plate member about a first axis;

hinge means interconnecting said first and second housings for enabling movement between said first and second housings about a hinge axis substantially perpendicular to said first axis;

and locking means for locking the position on said hinge axis of said first housing relative to said second housing.

14. An adjustment device for mounting a disintegrator head to a substantially horizontal support, comprising in combination:

a first beam extending substantially vertically from the support;

a second beam rotatably mounted to said first beam and extending substantially perpendicularly from said first beam;

a first housing having a first mounting member ans a first plate member;

means for mounting said first mounting member to said second beam for enabling linear and rotational movement relative to said second beam;

means for relatively journaling said first mounting member and said first plate member about a first axis;

means for locking said first mounting member relative to said first plate member;

a second housing having a second mounting member and a second plate member;

means for mounting the disintegrator head to said second mounting member for enabling linear movement of the disintegrator head relative to said second mounting member;

means for relatively journaling said second mounting member and said second plate member about a second axis;

means for locking said second mounting member relative to said second plate member;

hinge brackets extending from a region proximate an edge of each of said first and second plate members with said hinge brackets each having an aperture therethrough;

a hinge pin cooperating with said apertures of said hinge brackets of said first and second plate members for providing angular movement between said first and second housings about a hinge axis which is substantially perpendicular to and offset from said first and second axes of said first and second housings;

a first and a second coupling member mounted to said first and second housings, respectively;

a connection member slidably engaging one of said first and second coupling members forming apices of a triangle at said first and second coupling members and said hinge pin;

and fastening means for securing said connection member relative to said one of said first and second coupling members to lock on said hinge axis the position of said first housing relative to said second housing.

* * * * *